No. 664,071. Patented Dec. 18, 1900.
S. L. ALLEN.
CULTIVATOR BLADE.
(Application filed Mar. 6, 1899.)
(No Model.)
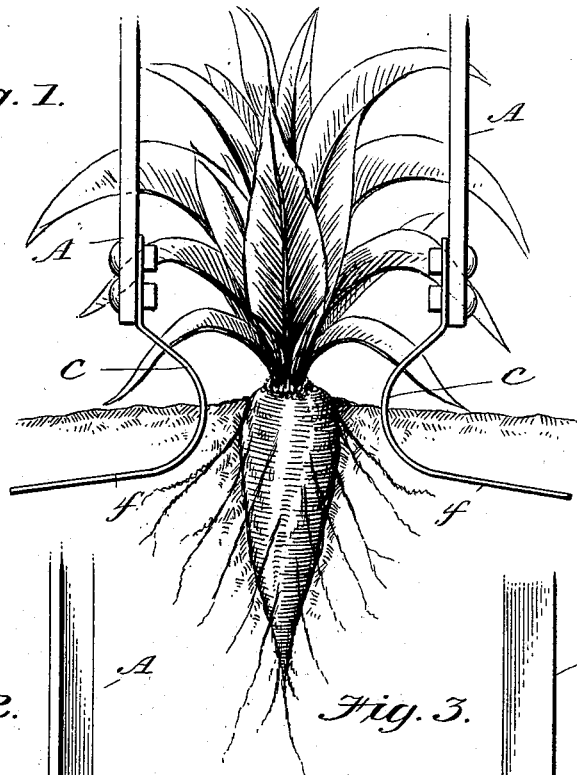
Fig. 1.
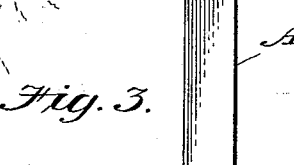
Fig. 2. Fig. 3.
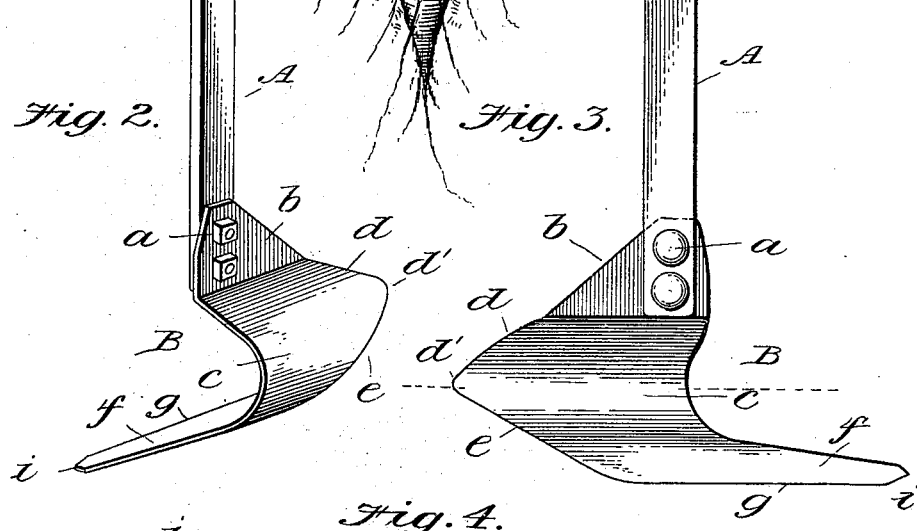
Fig. 4.
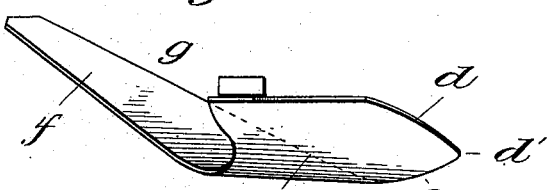
Witnesses.
J. T. Cross
J. W. Pattison.
Inventor,
Samuel L. Allen,
by I. Twe. Petit,
Attorney.
THE NORRIS PETERS CO., PHOTO-LITHO., WASHINGTON, D. C.

UNITED STATES PATENT OFFICE.

SAMUEL L. ALLEN, OF MOORESTOWN, NEW JERSEY.

CULTIVATOR-BLADE.

SPECIFICATION forming part of Letters Patent No. 664,071, dated December 18, 1900.

Application filed March 6, 1899. Serial No. 707,841. (No model.)

*To all whom it may concern:*

Be it known that I, SAMUEL L. ALLEN, a citizen of the United States, and a resident of Moorestown, State of New Jersey, have invented certain new and useful Improvements in Cultivator-Blades, of which the following is a full, clear, and exact description, reference being had to the accompanying drawings, forming part of this specification.

My invention relates to certain improvements in the construction of cultivator teeth or blades, and is particularly adapted to the cultivation of beets or other plants having a luxuriant growth of leaves, but which might be used for various kinds of crops.

The principal object of my invention is to provide a blade so constructed as to enable the operator to work the soil very close to the plants without covering them or impairing the roots and without danger of breaking or injuring their leaves; also, to provide a construction that will bring the cutting edges of the blade in close proximity to the plant, while the standard to which the blade is secured is far enough away from the plant not to injure the leaves or foliage; also, to provide a construction of blade to cut the earth from the surface downwardly in the nature of a draw cut, the sharpened portion or cutting edge of the blade beginning at or about the surface of the earth and receding at an angle to the base-line of the blade, the said blade above the level of the surface-line receding upwardly and backwardly, having a blunt edge operating as a leaf-guard to lift such leaves of the plant as may come in contact therewith and in combination with the inset standards to pass them by without injury; also, to provide a blade so constructed as to keep the loose earth from falling on the plant when working very close thereto.

With these objects in view my invention consists in the construction substantially as herein described, and particularly pointed out in the claims made hereto.

In the accompanying drawings, which form a part of this specification, and in which similar letters of reference are used to illustrate like parts, Figure 1 is an end elevation of a pair of blades embodying my invention, illustrating them in working position on each side of a plant. Fig. 2 is a perspective view of one of the blades. Fig. 3 is a side elevation of the same. Fig. 4 is a plan view of the same.

In the drawings, A designates the tooth-standard, constructed, preferably, of flat bar iron or steel and adapted to be secured to the frame of the machine by any of the well-known clamping devices.

B designates the blade, having a vertically-disposed ear $b$, adapted to be secured to the lower end of the standard A by means of bolts or rivets, as $a$. The middle portion $c$, which I term the "shield," is formed substantially semicircular in vertical section, as most clearly illustrated in Fig. 1 of the drawings. The forward edge of the shield $c$ is inclined at an angle of about forty-five degrees, as illustrated at $d$ in the drawings, running downwardly from the ear $b$ to a point $d'$, the said point $d'$ being slightly rounded, as illustrated most clearly in Fig. 3 of the drawings, the dotted line illustrating the average depth of penetration of the blade into the ground. The lower forward edge of the shield portion $c$ is inclined rearwardly toward the central portion of the blade, as illustrated at $e$ in the drawings, this edge being sharpened and serving as a cutting edge for the soil. The lower rear portion of the blade tapers outwardly and rearwardly from the bottom of the shield portion $c$, forming the part $f$, which in plan view would extend at about an angle of sixty degrees from the draft-line of the tooth, the front edge $g$ thereof being sharpened to form a cutting edge and being a continuation of the cutting edge $e$, while the rear edge $h$ inclines upwardly somewhat from the cutting edge $g$ and runs into the rear edge of the curved shield $c$. The rear end of the portion $f$ is preferably pointed, as illustrated at $i$ in Fig. 4 of the drawings.

In operation the two blades forming a pair are oppositely shaped to form rights and lefts, as clearly illustrated in Fig. 1 of the drawings, but need not be directly opposite each other, but might be arranged one in advance of the other. The curved shield portion $c$ extends inwardly toward the plant on each side thereof, so as to reach very close to the root of the plant just at the surface, but making a cut under the surface slanting away from the roots, thus cleaning the surface of weeds without injuring the roots. At the same time above the surface the blade curves away from the plant and saves the leaves, while the upwardly-extending ears b, to which the standards A are attached, are, say, two inches farther away from the plant than the nearest part of the shield c and cutting edge e, the arrangement thus preventing the standards A from coming close enough to the main stalk of the plant to injure or break the leaves. The inclined upper front edge d of the shield, which should be blunt, acts as a guard to guide the lower overhanging leaves of the plant in an upward direction away from the cutting edge e, while the shield c serves to keep the earth from falling on the plants after it has been loosened, and the rearwardly-extending blade f serves to loosen up the earth a sufficient distance on each side of the plant without throwing it up or forming a furrow, but simply loosening it around the plant, the sharpened edges g e forming cutting edges and being first presented to the ground. The inclined lower cutting edge e, slanting backward from where it enters the soil, makes a clean smooth cut and prevents young plants from being covered with earth, as is the case with hoeing-blades which enter the soil with an uplifting cut.

From my above-described construction the uses and advantages of my invention will be readily seen, as I have provided a cultivator-tooth which can be brought and worked much closer to the plant without breaking or injuring the leaves and at the same time providing a shield for throwing the loose earth away from the plant and providing a guard for guiding the overhanging leaves away from the cutting edge of the blade. My construction also throws the tooth-standard farther away from the plant on both sides thereof, thus obviating a difficulty which now exists, and prevents the teeth from working close to the plant on account of the liability of the standard bearing against and breaking off the leaves of the plant.

Having thus described my invention, what I claim, and desire to secure by Letters Patent, is—

1. In a cultivator-tooth, a blade adapted to enter the ground on one side of the plant to be worked having its cutting edge curved and receding downwardly and rearwardly from the surface of the ground to produce a draw cut in the soil, and a blunt edge inclined upwardly and rearwardly above the surface of the ground, said blunt edge being curved outwardly away from the plant being worked and operating as a leaf-guard to raise the leaves coming in contact therewith, substantially as described.

2. In a cultivator-tooth, a blade adapted to enter the ground on one side of the plant to be worked having its cutting edge curved and receding downwardly and rearwardly from the surface of the ground, a blunt edge inclined upwardly and rearwardly from the front cutting edge above the surface of the soil and curved outwardly away from the plant being worked to form a leaf-guard, and a standard secured to the outer upper portion of the blade so as to be out of the way of the leaves of the plant, substantially as described.

3. In a cultivator-tooth, a blade adapted to enter the ground on one side of the plant to be worked having its cutting edge receding downwardly and rearwardly from the surface of the earth, a main body portion substantially semicircular in cross-section curved inwardly toward the plant being worked, a narrow tapering arm extending outwardly and rearwardly from the said body portion and a cutting edge formed on the lower front edge of said arm, substantially as described.

4. In a cultivator-tooth, the combination of a vertical standard, a blade secured to the lower end of said standard adapted to enter the ground on one side of the plant to be cultivated having a shield portion substantially semicircular in cross-section extending from the standard inwardly toward the plant being worked, a narrow tapering blade extending outwardly and rearwardly from the lower part of the shield portion and a rearwardly-inclined blunt edge formed on the front edge of the shield portion above the cutting edge, substantially as described.

5. A cultivator-tooth comprising a curved shield portion c, extending inwardly toward the plant to be cultivated, an upwardly-extending ear, b, adapted to be secured to the lower end of the tooth-standard, an outwardly-extending narrow tapering blade, f, formed integral with the shield portion, c, an inclined blunt front edge, d, operating as a guard formed on the front of the shield, c, and a sharpened continuous edge formed from the lower portion of the shield, c, to the rear end of the blade, f, substantially as described.

6. A cultivator-tooth, the combination of a vertical standard, A, a blade having an upwardly-extending ear, b, adapted to be secured to the standard, A, an inwardly-curved shield portion, c, having its lower rear portion terminating in an outwardly-extending tapering blade, f, forming on the front edge of the lower portion of the shield, c, a cutting-surface, e, for making a downward cut and on the front edge of the outwardly-extending blade, f, a cutting-surface, g, for making an undercut and a downwardly-tapering blunt edge, d, provided on the front edge of the shield, c, substantially as described and for the purpose stated.

In witness whereof I have hereunto set my hand this 4th day of March, A. D. 1899.

SAMUEL L. ALLEN.

Witnesses:
BENJ. F. PERKINS,
J. T. CROSS.